March 12, 1940.  W. F. GROENE ET AL  2,193,279
LATHE HEADSTOCK
Filed Nov. 12, 1937    6 Sheets-Sheet 3
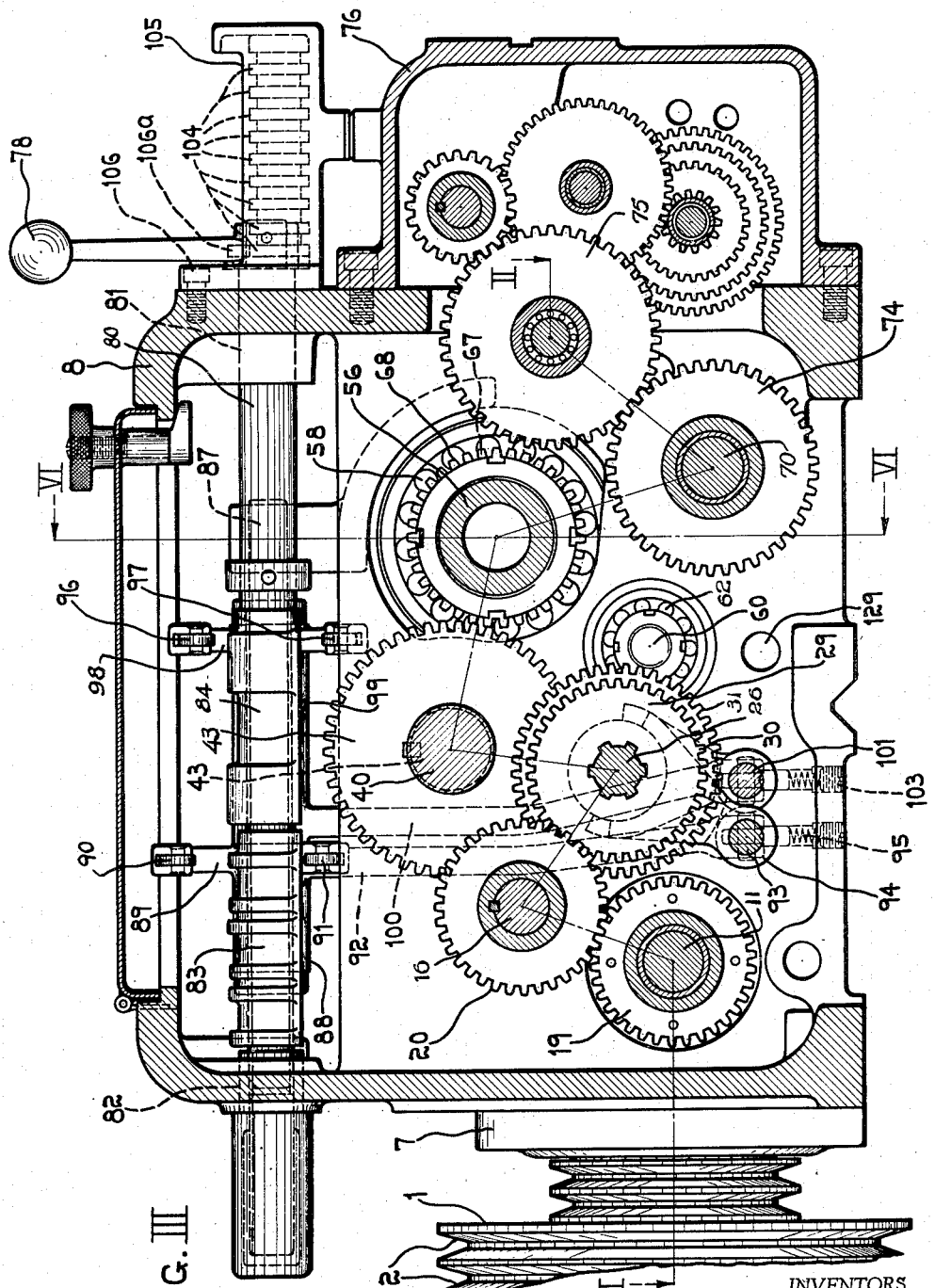
FIG. III
INVENTORS.
WILLIAM F. GROENE
HARRY C. KEMPER
AND HOWARD E. DARBY
BY Willard L. Groene ATTORNEY.

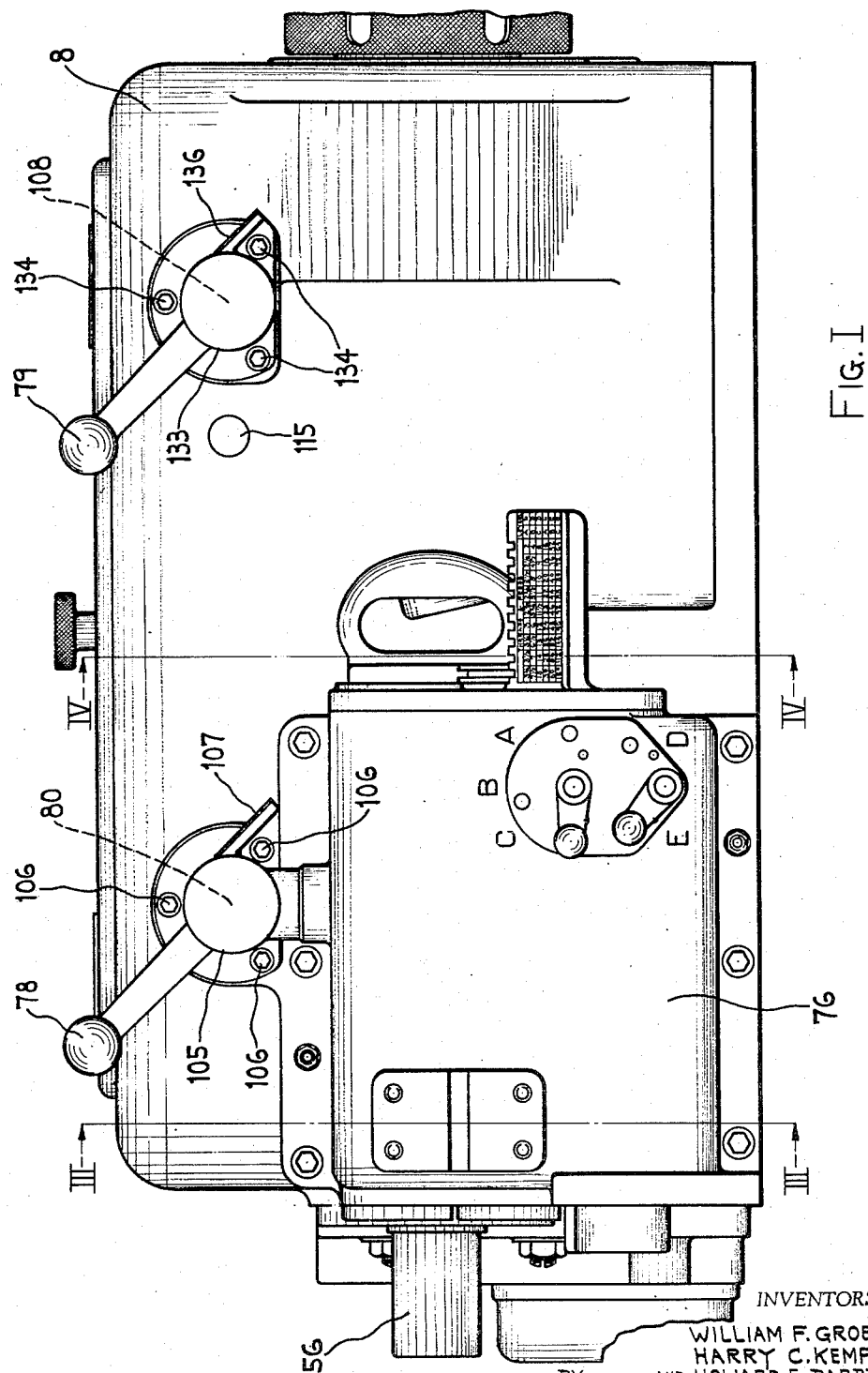

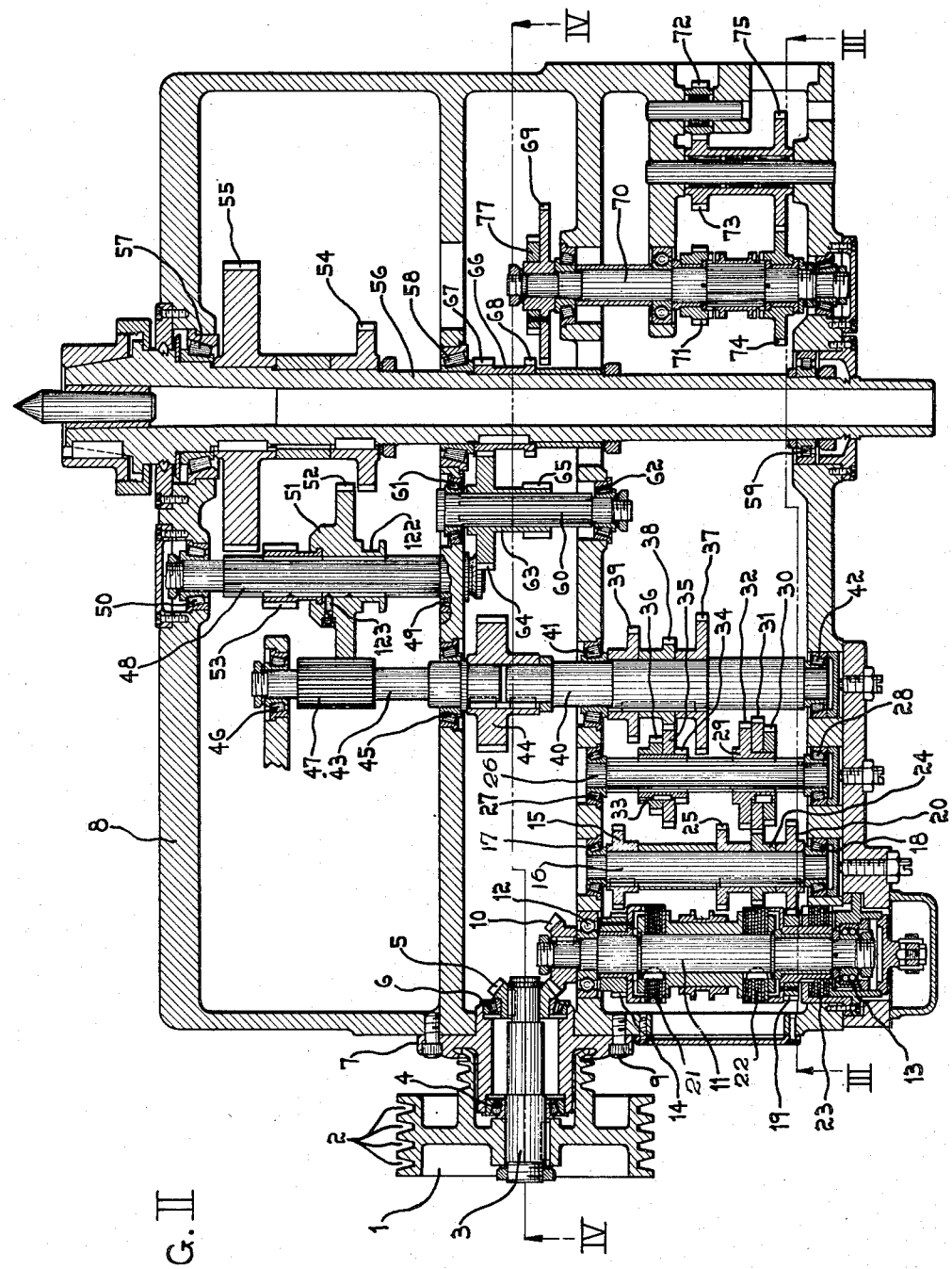

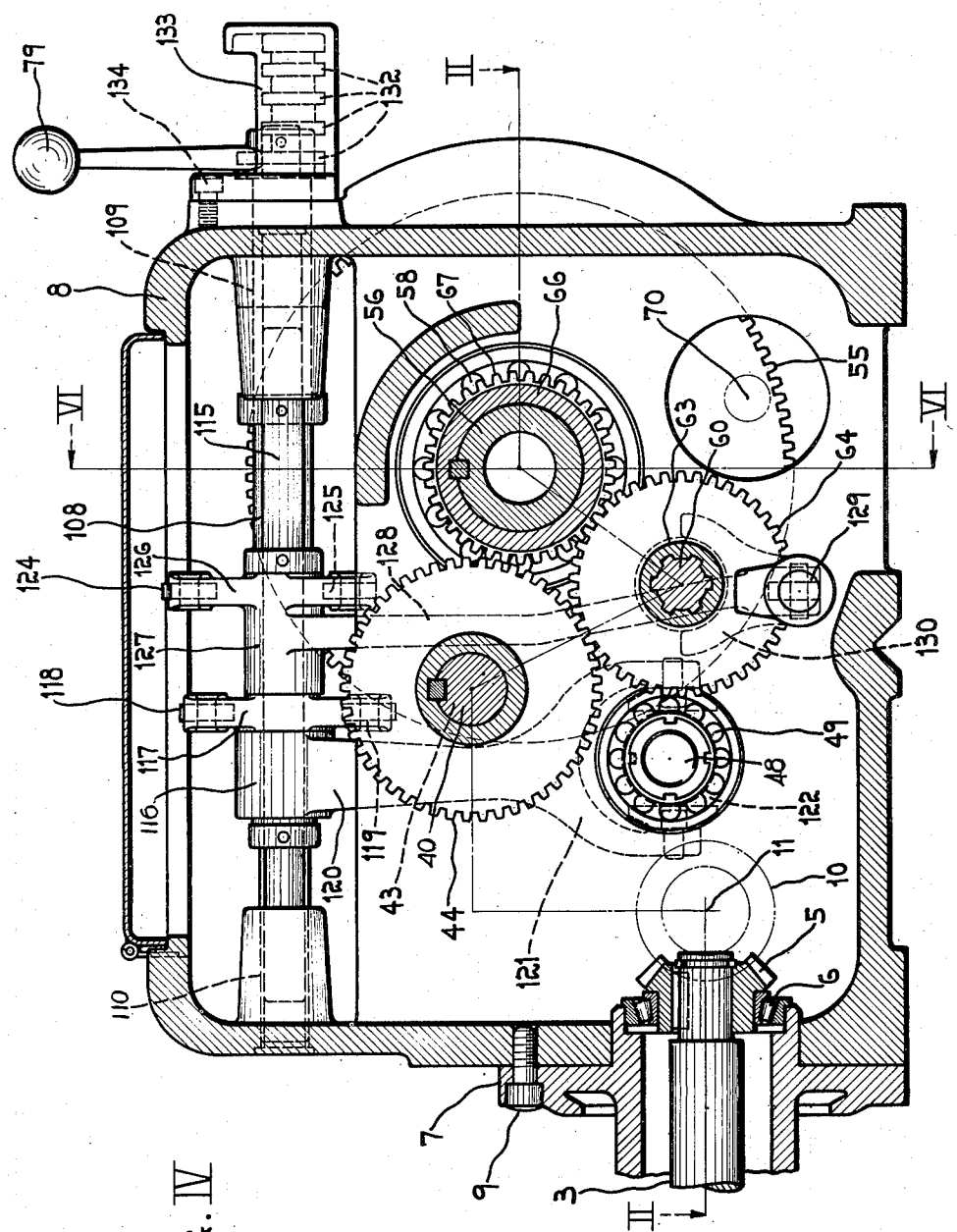

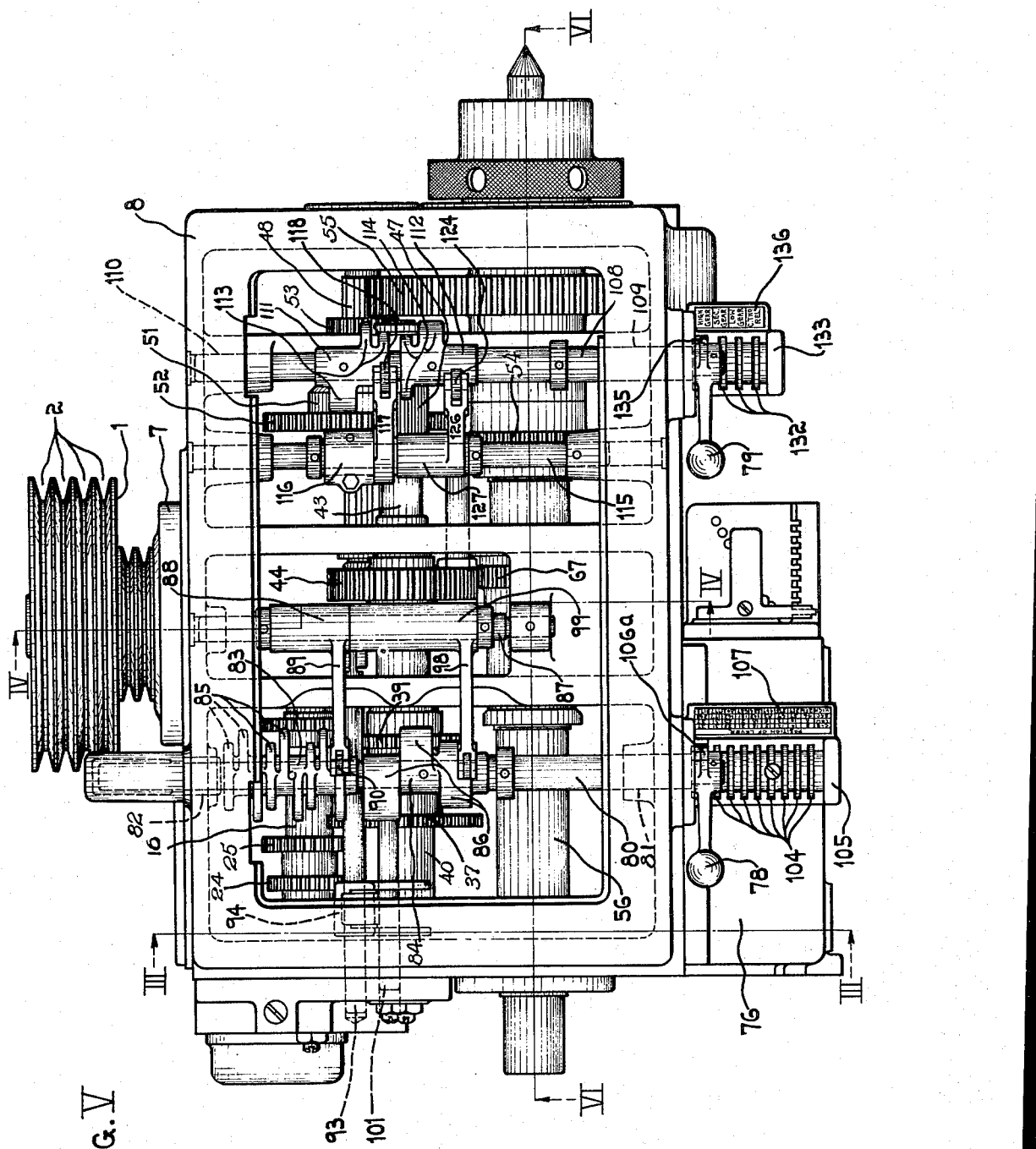

March 12, 1940. W. F. GROENE ET AL 2,193,279
LATHE HEADSTOCK
Filed Nov. 12, 1937 6 Sheets-Sheet 6
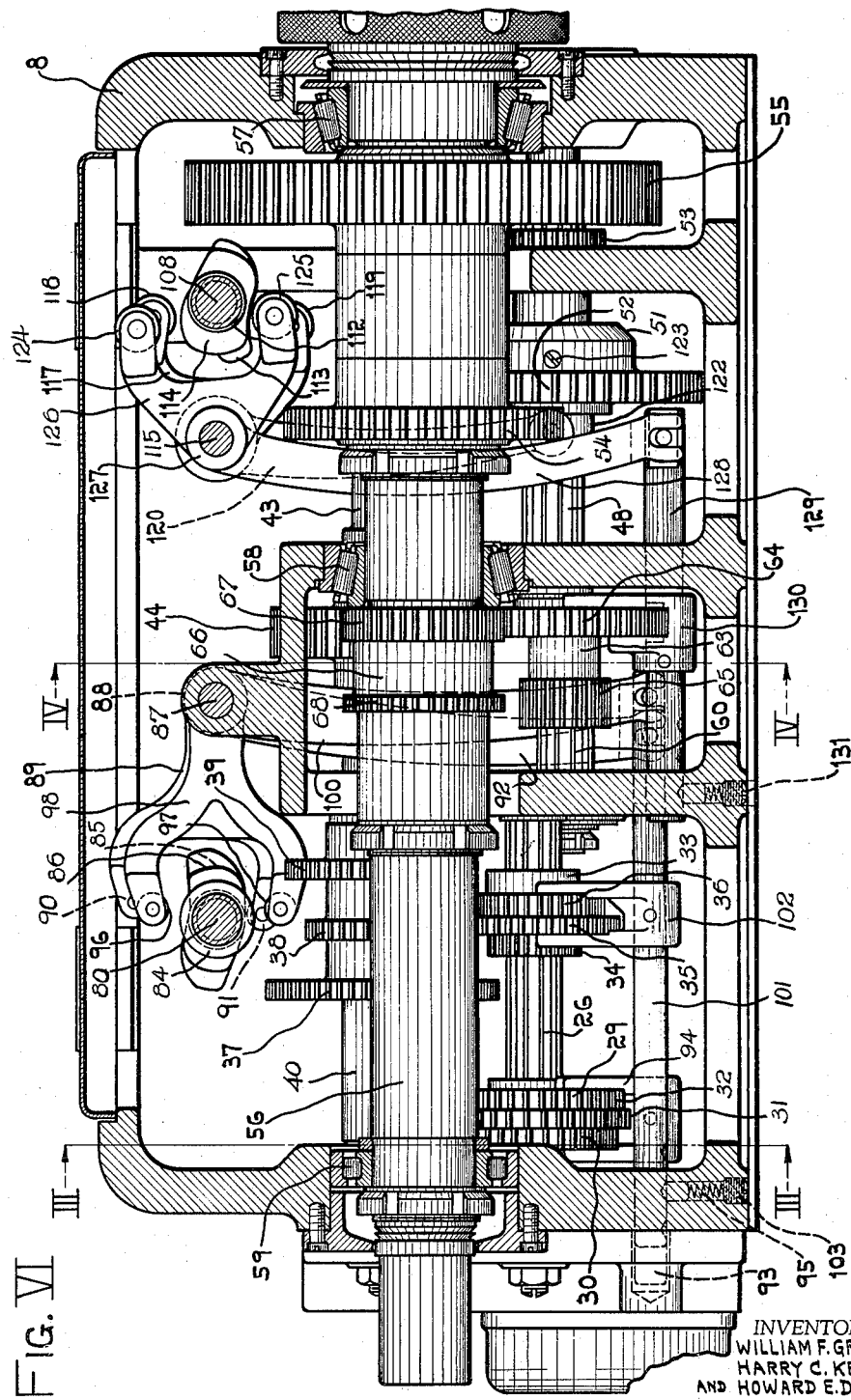
FIG. VI
INVENTORS.
WILLIAM F. GROENE
HARRY C. KEMPER
AND HOWARD E. DARBY
BY Willard L. Groene ATTORNEY.

Patented Mar. 12, 1940

2,193,279

UNITED STATES PATENT OFFICE 2,193,279

LATHE HEADSTOCK

William F. Groene, Harry C. Kemper, and Howard E. Darby, Cincinnati, Ohio, assignors to The R. K. Le Blond Machine Tool Company, Cincinnati, Ohio, a corporation of Delaware Application November 12, 1937, Serial No. 174,216

13 Claims. (Cl. 82—29)

This invention pertains to lathe headstocks and more particularly to the change speed transmission mechanism in the headstock and the means for effecting the various speed changes.

One object of this invention is to provide in a lathe headstock transmission a pair of shiftable compound gears which may be actuated to provide low-back-gear and high-back-gear speeds with standard threads and feeds, high speed with fine threads and feeds, and low-back-gear speed with coarse threads for relieving.

Another object is to provide in a lathe a single lever for actuating the transmission whereby low-back-gear and high-back-gear speeds with standard threads and feeds, high speed with fine threads and feeds, and low-back-gear speed with coarse threads for relieving, may be quickly affected.

A still further object is to provide in a lathe having a series of speed changes, a plurality of levers which may be positioned while the lathe is in operation whereby a speed change may be preselected without stopping the operation of the lathe.

And still another object is to provide in a lathe transmission having a series of primary speed changes and a series of back-gear speed changes, a pair of control levers, one for each series of speed changes, for preselecting speed changes for one or both of said series.

Further features and advantages of our invention will be set forth in the following description of the drawings in which:

Figure I is a front elevation of the exterior of a headstock incorporating the features of our invention.

Figure II is a diagrammatic section through the transmission gearing incorporated in the headstock on the line II—II of Figures III and IV.

Figure III is a vertical transverse section through the headstock on the line III—III of Figures I, II, V and VI.

Figure IV is a vertical transverse section through the headstock on the line IV—IV of Figures I, II, V and VI.

Figure V is a plan view of the headstock with the top cover removed.

Figure VI is a vertical longitudinal section through the headstock on the line VI—VI of Figures III, IV and V.

Referring particularly to Figures II, III and IV, power for driving the headstock transmission is derived from the usual electric motor which is connected to the driving pulley 1 by suitable V-belts which operate in the grooves 2 in the pulley. The driving pulley 1 is fixed on the shaft 3 which is journaled on the bearing 4 and through the bevel gear 5 on the bearing 6 carried in the bracket 7 bolted to the rear of the headstock housing 8 by suitable screws 9. The bevel gear 5 engages and drives the bevel gear 10 fixed on the clutch shaft 11 journaled on bearings 12 and 13 carried in the headstock housing 8. Adjacent the bearing 12 is rotatably mounted on the shaft 11, a 33-tooth gear 14 which drives a 33-tooth gear 15 through an idler gear (not shown), the gear 15 being fixed on a shaft 16 journaled on bearings 17 and 18 carried in the headstock housing 8. Adjacent the bearing 13 is rotatably mounted on a 36-tooth gear 19 which drives a 36-tooth gear 20 fixed on the shaft 16. Multiple disc clutches 21 and 22 are provided on shaft 11 for alternately causing one or the other of the respective gears 14 and 19 to be driven by the shaft 11 whereby the shaft 16 through the gearing described, may be rotated in one direction or the other. A multiple disc brake 23 is also provided on the shaft 11 for arresting rotation of the shaft 11 when both of the clutches 21 and 22 are rendered inoperative.

On the shaft 16 is also fixed a 29-tooth gear 24 and a 33-tooth gear 25. On a splined shaft 26 journaled in bearings 27 and 28 carried in the headstock housing 8 is slidably mounted a cluster gear 29 comprising a 39-tooth gear 30, a 46-tooth gear 31, and a 32-tooth gear 32 which gears may be selectively engaged with the respective gears 20, 24 and 25 whereby the shaft 26 may be rotated at three different speeds by the shaft 16.

Also slidably mounted on the splined shaft 26 is a cluster gear 33 comprising an 18-tooth gear 34, a 36-tooth gear 35, and a 27-tooth gear 36, which gears may be selectively engaged with the respective 50-tooth gear 37, the 32-tooth gear 38, and the 41-tooth gear 39 fixed on the shaft 40 journaled in the bearings 41 and 42 carried in the headstock housing 8. Thus three different speed changes may be had between shaft 26 and shaft 40 or a total of nine speed changes may be effected between shaft 16 and shaft 40 by properly shifting the cluster gears 29 and 33, these speed changes being the nine primary speed changes of the headstock transmission.

The shaft 40 is coupled to the coaxial shaft 43 by the wide-faced 48-tooth gear 44, the shaft 43 being journaled in bearings 45 and 46 carried in the headstock housing 8 and having a wide-faced 15-tooth pinion 47 formed integral therewith. Slidably mounted on a splined shaft 48 journaled in bearings 49 and 50 carried in the headstock housing 8 is a compound gear 51 comprising a large 65-tooth gear 52 and a 20-tooth pinion 53 which are adapted to be respectively engaged with the 60-tooth gear 54 and the 105-tooth gear 55 fixed on the lathe spindle 56 which is journaled in bearings 57, 58 and 59 in the headstock housing 8. The compound gear 51 may also be moved to a neutral position, as shown in Figure II, where neither of its gears 52 and 53 engage the gears 54 and 55 on the lathe spindle 56. The gear 52 is at all times engaged with the pinion 47 on the shaft 43. When the gears 53 and 55 are engaged the spindle 56 is driven at low-back-gear speeds and when the gears 52 and 54 are engaged the spindle is driven at high-back-gear speeds.

Slidably mounted on a splined shaft 60 journaled in bearings 61 and 62 carried in the headstock housing 8 is a compound gear 63 comprising the 42-tooth gear 64 and the 20-tooth pinion 65. On the spindle 56 is fixed a double gear 66 having a wide faced 34-tooth gear 67 and a narrow faced 34-tooth gear 68. When the compound gear 63 is shifted to the position shown in Figure II, the gear 64 is engaged with the gear 44 and the gear 67, as best seen in Figure IV, whereby the spindle is driven at high speed from the shaft 40 at which time the compound gear 51 is moved to neutral position rendering the low and high back gear drive inoperative.

When the spindle 56 is being driven at high speed from shaft 40 through the gears 44, 64 and 67 it is desired to provide reduced rate of feed to the cutting tool. This is done by connecting the 20-tooth pinion 65 to the large 65-tooth gear 69 fixed on the feed reverse shaft 70, power from this shaft being transmitted through reversing gearing comprising the gears 71, 72 and 73, and 74, and 75 to a feed box 76 mounted on the front of the lathe headstock 8 in a manner set forth in application Serial Number 84,500 filed June 10, 1936.

When it is desired to operate the lathe at very slow spindle speeds and with a coarse feed to the cutting tool as when it is to be used for coarse threading or relieving hobs, taps, etc., the compound back gear 51 is shifted so that its pinion 53 is in mesh with the gear 55 on the spindle and the compound gear 63 is shifted so that its gear 64 is disengaged from the gear 67 but remains engaged with gear 44 on the shaft 40 so that the spindle is rotated at low back gear speeds for coarse threading and relieving. In order to provide the coarse feed rate drive to the shaft 70 the gear 65 is also maintained in contact with the gear 69 as was done in the case of the fine feed with high spindle speeds described above. Since the drive from shaft 40 to shaft 70 is the same in both instances the provision of the coarse feed in the latter instance is accomplished by cutting the speed of rotation of the spindle relative to shaft 40 by utilizing the back gears 53 and 55 and disconnecting the high speed driving gears 64 and 67.

When it is desired to operate the lathe in low back gear or high back gear speeds with regular rates of feed for the cutting tool as in normal lathe turning operations, the compound back gear 51 is shifted so either gears 53 and 55 or gears 52 and 54 are in mesh. Regular rates of feed in combination with these spindle speeds is accomplished by sliding the compound gear 63 so that its gear 64 is disengaged from both gears 44 and 67 and is connected as an idler gear between the 34-tooth gear 68 and the lathe spindle 56 and a similar 34-tooth gear 77 fixed on the shaft 70, whereby the shaft 70 and the spindle 56 rotate in synchronism, the gear 65 being disengaged from the gear 69.

It will thus be seen that in this headstock transmission there are four elements to be actuated to obtain the various functions from the transmission. These elements comprise the cluster gears 29 and 33 which may be actuated by a control lever 78 and the compound gears 51 and 63 which may be actuated by the control lever 79, these levers being conveniently located at the front of the headstock housing 8 and having mechanism associated therewith for moving the various elements in proper sequence.

The lever 78 is fixed on a rock shaft 80 which is slidably mounted in bearings 81 and 82 in the headstock housing 8. On the shaft 80 are fixed operating cams 83 and 84 each having the respective peripheral cam surfaces 85 and 86. On a pivot shaft 87 fixed in the headstock housing 8 is pivotally mounted a bell crank 88 one of its arms 89 being forked, as best shown in Figure VI, upon the ends of which are mounted rollers 90 and 91 which are located on diametrically opposite sides of the shaft 80 and adapted to be engaged by the peripheral cam surfaces 85 when the lever 78 is swung to clockwise position, Figure I and which rollers 90 and 91 are relieved from engagement from said cam surfaces when the lever 78 is swung to counterclockwise position, whereby the lever 78 may be pulled in and out to axially move the shaft 80 for presenting the various cam surfaces 85 to the rollers 90 and 91. By this arrangement the arm 89 may be swung upward and downward different amounts depending upon the axial position of the shaft 80. The other downwardly extending arm 92 of the bell crank 88 is connected to a shifter rod 93 which carries a yoke 94 which engages the cluster gear 29 whereby manipulation of the lever 78 causes shifting of this cluster gear by the cam 83 as described. Suitable detent mechanism 95 associated with the shifter rod 93 maintains the cluster gear and its associated bell crank lever in any selected position set up by the actuating cam 83.

In a similar manner the cluster gear 33 is actuated by the cam 84 actuating the rollers 96 and 97 on the arm 98 of the bell crank lever 99 pivotally mounted on the shaft 87 and having a downwardly extending arm 100 connected to the shifter rod 101 which carries a yoke 102 engaging the compound gear 33. Detent mechanism 103 is also associated with the shifter rod 101 as for the rod 95.

The cams 83 and 84 are so arranged as to simultaneously actuate the cluster gears 29 and 33 in proper sequence for the various selected positions of the lever 78. A series of arcuate slots 104, provided in a bracket 105 fixed on the front of the headstock 8 by screws 106 serve to axially position the shaft 80 and its lever 78 when the lever is swung to clockwise position whereupon the locating lug 106A formed on the lever 78 has entered one of the slots 104. An index plate 107 is also associated with the locating slots to indicate the various speeds selected and is interrelated with positions of lever 79.

In effecting speed changes the lever 78 is swung to counterclockwise position and moved in and out to the desired slot 104 as shown by the index plate 107 thus preselecting the next speed change to be made. During this movement of the lever 78 the speed change then in operation is not affected and continues to operate until the lever 78

78, at its newly selected position, is swung clockwise to rapidly put the newly preselected speed change in operation. Thus no time is lost in making selection of speed changes since the next desired speed change may be preselected while the lathe is still operating in the speed then in operation. It will also be noted that all of the primary speed changes in the headstock transmission may be affected by a single lever control.

The lever 79 for selecting the low-back-gear, high back gear, high speeding, and coarse threading and relieving speeds is arranged similarly to that of lever 78 described above. The lever 79 effects movements of the compound gears 51 and 63, the lever 79 being fixed on a rock shaft 108 which is slidably mounted in bearings 109 and 110 in the headstock housing 8. On the shaft 108 are fixed operating cams 111 and 112 each having the respective peripheral cam surfaces 113 and 114. On a pivot shaft 115 fixed in the headstock housing 8 is pivotally mounted a bell crank lever 116, one of its arms 117 being forked, as best shown in Figure VI, having rollers 118 and 119 on the forked ends which may be engaged by the peripheral cam surfaces 113 when lever 79 is swung to clockwise position and which rollers are relieved from engagement from said surfaces when lever 79 is swung to counterclockwise position as in the case of lever 78. The other downwardly extending arm 120 of bell crank 116 has a forked yoke 121 engaging in the annular slot 122 formed in the compound gear 51 whereby manipulation of the lever 79 causes shifting of this cluster gear by the cam 83 as described. Detent mechanism 123 is provided in the compound gear 51 and maintains the cluster gear and its associated bell crank lever in any selected position set up by the actuating cam 111.

In a similar manner the cluster gear 63 is actuated by the cam 112 actuating the rollers 124 and 125 and the arm 126 of the bell crank lever 127 pivotally mounted on the shaft 115 and having a downwardly extending arm 128 connected to a shifter rod 129 which carries a yoke 130 engaging the cluster gear 63. Detent mechanism 131 is associated with the shifter rod 129 for maintaining the cluster gear 63 and its associated bell crank 127 in shifted positions.

The cams 111 and 112 are so arranged as to simultaneously actuate the compound gears 51 and 63 in proper sequence for the various selected positions of the lever 79. A series of arcuate slots 132, provided in a bracket 133 fixed on the front of the headstock 8 by screws 134 serve to axially position the shaft 108 and its lever 79 when the lever is swung to clockwise position whereupon the locating lug 135 formed on the lever 79 has entered one of the slots 132. An index plate 136 is also associated with the locating slots to indicate the various positions to be selected by the lever 79. In effecting speed changes the lever 79 is manipulated in the same manner as the lever 78 already described.

Having fully set forth and described our invention, what we claim is:

1. In a lathe headstock transmission, a shaft, means for driving said shaft at a plurality of different speeds, a pinion on said shaft, a second shaft, a compound gear slidably mounted on said shaft having one of its gears in constant mesh with said pinion, a work spindle, a pair of gears fixed on said spindle adapted to be alternately engaged by said compound gear, a third shaft, a compound gear slidably mounted on said third shaft, a gear fixed on said first mentioned shaft and a gear fixed on said spindle adapted to engage one of the gears of said compound gear on said third shaft, a feed output shaft, gearing on said output shaft adapted to be connected to said work spindle or said first mentioned shaft by said compound gear mounted on said third shaft, and means for connecting said output shaft to a tool feed carriage of said lathe.

2. In a lathe headstock transmission, a shaft, means for driving said shaft at a plurality of different speeds, a pinion on said shaft, a second shaft, a compound gear slidably mounted on said shaft having one of its gears in constant mesh with said pinion, a work spindle, a pair of gears fixed on said spindle adapted to be alternately engaged by said compound gear, a third shaft, a compound gear slidably mounted on said third shaft, a gear fixed on said first mentioned shaft and a gear fixed on said spindle adapted to engage one of the gears of said compound gear on said third shaft, a feed output shaft, a pair of gears fixed on said shaft adapted to be engaged by one or the other of the gears of said compound gear when shifted on said third shaft so as to in one instance connect said output shaft to said work spindle and in the other instance to connect said output shaft to the first mentioned shaft, and means for connecting said output shaft to a tool feed carriage of said lathe.

3. In a lathe headstock transmission, a shaft, means for driving said shaft at a plurality of different speeds, a pinion on said shaft, a second shaft, a compound gear slidably mounted on said shaft having one of its gears in constant mesh with said pinion, a work spindle, a pair of gears fixed on said spindle adapted to be alternately engaged by said compound gear, a third shaft, a compound gear slidably mounted on said third shaft, a gear fixed on said first mentioned shaft and a gear fixed on said spindle adapted to engage one gear of said compound gear on said third shaft, a feed output shaft, a pair of gears fixed on said output shaft, a gear fixed on said work spindle, means for sliding said compound gear on said third shaft so as to simultaneously engage its one gear with the gear on said first mentioned shaft and the gear on said work spindle and its other gear with one of the gears on said output shaft, and means for connecting said output shaft to a tool feed carriage of said lathe.

4. In a lathe headstock transmission, a shaft, means for driving said shaft at a plurality of different speeds, a pinion on said shaft, a second shaft, a compound gear slidably mounted on said shaft having one of its gears in constant mesh with said pinion, a work spindle, a pair of gears fixed on said spindle adapted to be alternately engaged by said compound gear, a third shaft, a compound gear slidably mounted on said third shaft, a gear fixed on said first mentioned shaft and a gear fixed on said spindle adapted to engage one gear of said compound gear on said third shaft, a feed output shaft, a pair of gears fixed on said output shaft, a gear fixed on said work spindle, means for sliding said compound gear on said third shaft so as to simultaneously engage its one gear with the gear on said first mentioned shaft and the gear on said work spindle and its other gear with one of the gears on said output shaft, said means being also adapted to slide said compound gear on said third shaft to simultaneously engage said one gear with the gear on said first mentioned shaft and its other gear with one of the gears on said output shaft, and means for connecting said output shaft to a tool feed carriage of said lathe.

5. In a lathe headstock transmission, a shaft, means for driving said shaft at a plurality of different speeds, a pinion on said shaft, a second shaft, a compound gear slidably mounted on said shaft having one of its gears in constant mesh with said pinion, a work spindle, a pair of gears fixed on said spindle adapted to be alternately engaged by said compound gear, a third shaft, a compound gear slidably mounted on said third shaft, a gear fixed on said first mentioned shaft and a gear fixed on said spindle adapted to engage one gear of said compound gear on said third shaft, a feed output shaft, a pair of gears fixed on said output shaft, a gear fixed on said work spindle, means for sliding said compound gear on said third shaft so as to simultaneously engage its one gear with the gear on said first mentioned shaft and the gear on said work spindle and its other gear with one of the gears on said output shaft, said means being also adapted to slide said compound gear on said third shaft to simultaneously engage said one gear with the gear on said first mentioned shaft and its other gear with one of the gears on said output shaft, and also said means being adapted to slide said compound gear on said third shaft to simultaneously engage said one gear with the gear on said spindle and the other gear on said output shaft, and means for connecting said output shaft to a tool feed carriage of said lathe.

6. In a lathe headstock transmission, a drive shaft, a work spindle, an intermediate shaft, a shiftable compound gear on said intermediate shaft interconnecting gears on said drive shaft and said spindle whereby said spindle may be rotated at low and medium speeds from said drive shaft, a second intermediate shaft, a second shiftable compound gear on said second shaft having one of its gears adapted to interconnect gears on said drive shaft and said work spindle in order to rotate said spindle at high speeds, a feed transmission associated with said headstock and means whereby both of the gears of said second compound gear may be alternately connected to said feed transmission.

7. In a lathe headstock transmission, a drive shaft, a work spindle, an intermediate shaft, a shiftable compound gear on said intermediate shaft interconnecting gears on said drive shaft and said spindle whereby said spindle may be rotated at low and medium speeds from said drive shaft, a second intermediate shaft, a second shiftable compound gear on said second shaft having one of its gears adapted to interconnect gears on said drive shaft and said work spindle or to interconnect said spindle with the feed transmission of said lathe, and means for connecting or disconnecting the other gear of said second compound gear with respect to said feed transmission.

8. In a lathe headstock transmission, a drive shaft, a work spindle, an intermediate shaft, a shiftable compound gear having a neutral position on said intermediate shaft interconnecting gears on said drive shaft and said spindle whereby said spindle may be rotated at a plurality of different speeds from said drive shaft, a second intermediate shaft, a second shiftable compound gear on said second shaft having one of its gears adapted to interconnect gears on said drive shaft and said work spindle or to interconnect said spindle with the feed transmission of said lathe, means for shifting said second compound gear so as to cause its one gear to interconnect said drive shaft and said spindle when said first mentioned compound gear is shifted to its neutral position, and means to cause said other gear of said second compound gear to be connected to the feed transmission of the lathe when the first mentioned gear of said second compound gear interconnects said drive shaft and said work spindle.

9. In a lathe headstock transmission, a drive shaft, a work spindle, an intermediate shaft, a shiftable compound gear on said intermediate shaft interconnecting gears on said drive shaft and said spindle whereby said spindle may be rotated at low or high speeds upon being shifted to a neutral position disconnected from said spindle, a second intermediate shaft, a second shiftable compound gear on said second shaft having one of its gears adapted to be connected to said drive shaft and its other gear connected to the feed transmission of the lathe, means for shifting said first mentioned compound gear to effect low spindle speed when said second compound gear is interconnected between said drive shaft and said feed transmission.

10. In a lathe headstock transmission, a drive shaft, a work spindle, an intermediate shaft, a shiftable compound gear on said intermediate shaft interconnecting gears on said drive shaft and said spindle whereby said spindle may be rotated at low or high speeds by shifting said compound gear, said compound gear being shiftable to a neutral position disconnected from said spindle, a second intermediate shaft, a second shiftable compound gear on said second shaft having one of its gears adapted to interconnect said spindle and the feed transmission of the lathe, and means for shifting said first mentioned compound gear to effect low or high spindle speeds when said second compound gear is interconnected between said spindle and said feed transmission of the lathe.

11. In a lathe headstock transmission, a drive shaft, a work spindle, an intermediate shaft, a shiftable compound gear on said intermediate shaft for connecting driving power from said drive shaft to said spindle, a second intermediate shaft, a shiftable compound gear on said second intermediate shaft for connecting driving power from said drive shaft or said spindle to the feed transmission of the lathe, and means for shifting both compound gears in a predetermined sequence.

12. In a lathe headstock transmission, a drive shaft, an intermediate shaft, a compound gear slidably mounted on said intermediate shaft comprising a large gear and a pinion, a pinion on said drive shaft engaging said large gear so said compound gear is at all times rotated by said drive shaft, a pair of gears on said spindle adapted to be engaged by the gear and pinion of said compound gear or to be disengaged therefrom, a second intermediate shaft, a second compound gear slidably mounted on said second intermediate shaft for movement to a series of predetermined positions on said shaft and comprising a large gear and a pinion, a feed transmission associated with said headstock transmission, and means to effect engagement of said large gear of said second compound gear with gears on said drive shaft, said spindle, and the feed transmission of the lathe and to effect engagement of said pinion of said second compound gear with said feed transmission.

13. In a lathe headstock transmission, a drive shaft, a work spindle, change gear mechanism between said shaft and said spindle whereby said spindle may be rotated at low and high speeds, an intermediate shaft, a second compound gear slidably mounted on said intermediate shaft for movement to three predetermined positions on said shaft and comprising a large gear and a pinion, a feed transmission associated with said headstock transmission, a power input shaft in said feed transmission, and means for moving said second compound gear so that when in one position its large gear engages gears on said drive shaft and said work spindle and its pinion engages a gear on said input shaft of the feed transmission; when in a second position its large gear engages a gear on said drive shaft and its pinion engages a gear on said output shaft; and when in a third position its large gear engages gears on said spindle and output shaft while its pinion is inoperative.

WILLIAM F. GROENE.
HARRY C. KEMPER.
HOWARD E. DARBY.